United States Patent
Chiba et al.

(10) Patent No.: US 10,135,273 B2
(45) Date of Patent: Nov. 20, 2018

(54) ELECTRONIC DEVICE, POWER FEEDING DEVICE AND ELECTRONIC DEVICE SYSTEM

(71) Applicant: FUJITSU COMPONENT LIMITED, Tokyo (JP)

(72) Inventors: Masafumi Chiba, Tokyo (JP); Hiromi Ohtsuka, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 69 days.

(21) Appl. No.: 14/882,984

(22) Filed: Oct. 14, 2015

(65) Prior Publication Data

US 2016/0268826 A1    Sep. 15, 2016

(30) Foreign Application Priority Data

Mar. 13, 2015   (JP) ................................ 2015-051397

(51) Int. Cl.
*H02J 7/00* (2006.01)

(52) U.S. Cl.
CPC .......... *H02J 7/0045* (2013.01); *H02J 7/0042* (2013.01); *H02J 7/0044* (2013.01); *H02J 7/0052* (2013.01)

(58) Field of Classification Search
CPC ...... H02J 7/0045; H02J 7/0052; H02J 7/0042; H02J 7/0044
See application file for complete search history.

(56) References Cited

U.S. PATENT DOCUMENTS

| | | | |
|---|---|---|---|
| 4,143,382 A | 3/1979 | Brill et al. | |
| 4,536,694 A | 8/1985 | McCarty et al. | |
| 5,059,885 A * | 10/1991 | Weiss | H02J 7/0042 320/115 |
| 5,939,859 A | 8/1999 | Morita | |
| 6,049,192 A * | 4/2000 | Kfoury | H02J 7/0044 320/113 |
| 8,312,937 B2 * | 11/2012 | Turner | H01M 2/1022 173/216 |
| 9,147,866 B2 | 9/2015 | Hojo et al. | |
| 2002/0075397 A1 * | 6/2002 | Hanada | H04N 5/2251 348/372 |

(Continued)

FOREIGN PATENT DOCUMENTS

| CN | 103269868 | 8/2013 |
|---|---|---|
| CN | 204102198 | 1/2015 |

(Continued)

OTHER PUBLICATIONS

J-PlatPat English Abstract, Publication No. 10-210664 published Aug. 7, 1998.

(Continued)

*Primary Examiner* — Drew A Dunn
*Assistant Examiner* — Sailesh Thapa
(74) *Attorney, Agent, or Firm* — Staas & Halsey LLP

(57) ABSTRACT

An electronic device that is driven by a battery and is capable of being attached to a power feeding device that feeds power to the electronic device, including: a surface opposite to the power feeding device when the electronic device is attached to the power feeding device; an electrode provided on the surface; and any one of a groove and a projection provided on the surface.

16 Claims, 17 Drawing Sheets

(56) References Cited

U.S. PATENT DOCUMENTS

| | | | |
|---|---|---|---|
| 2004/0204056 A1* | 10/2004 | Phelps, III | H02J 7/0044 455/556.1 |
| 2006/0089178 A1* | 4/2006 | Sakata | H02J 7/0044 455/573 |
| 2006/0132609 A1* | 6/2006 | Nogo | H04N 1/00278 348/207.2 |
| 2006/0279251 A1* | 12/2006 | Guyot | H02J 7/0044 320/107 |
| 2010/0072945 A1 | 3/2010 | Tiede et al. | |
| 2012/0043409 A1 | 2/2012 | Takei | |
| 2012/0069118 A1 | 3/2012 | Mistyurik et al. | |
| 2012/0075397 A1 | 3/2012 | Mistyurik et al. | |
| 2012/0081492 A1 | 4/2012 | Mistyurik et al. | |
| 2012/0081493 A1 | 4/2012 | Mistyurik et al. | |
| 2013/0023312 A1 | 1/2013 | Staebler | |
| 2015/0192957 A1* | 7/2015 | Lee | G06F 1/1632 361/679.58 |

FOREIGN PATENT DOCUMENTS

| | | |
|---|---|---|
| DE | 10 2008 042 267 A1 | 4/2010 |
| EP | 2 824 795 A1 | 1/2015 |
| JP | 10-162865 | 6/1998 |
| JP | 10-210664 | 8/1998 |
| JP | 2000-253592 | 9/2000 |
| JP | 2005-238731 | 9/2005 |
| JP | 2006-115601 | 4/2006 |
| JP | 2014-521305 | 8/2014 |
| WO | 91/03092 | 3/1991 |

OTHER PUBLICATIONS

J-PlatPat English Abstract, Publication No. 10-162865 published Jun. 19, 1998.
J-PlatPat English Abstract, Publication No. 2006-115601 published Apr. 27, 2006.
J-PlatPat English Abstract, Publication No. 2000-253592 published Sep. 14, 2000.
Korean Office Action dated Dec. 19, 2016 in corresponding Korean Patent Application No. 10-2015-0151988.
Extended European Search Report dated Jul. 19, 2016 in corresponding European Patent Application No. 15188897.1.
Office Action for Chinese Patent Application No. 201510882731.8, dated Mar. 14, 2017.
Espacenet English Abstract for CN 103269868, published Aug. 28, 2013.
Espacenet English Abstract for CN 204102198, published Jan. 14, 2015.
J-PlatPat English Abstract for JP 2005-238731, published Sep. 8, 2005.

* cited by examiner

SIDE FACE DIRECTION

FRONT-BACK DIRECTION

RIGHT AND LEFT DIRECTION

ELECTRONIC DEVICE, POWER FEEDING DEVICE AND ELECTRONIC DEVICE SYSTEM

CROSS-REFERENCE TO RELATED APPLICATION

This application is based upon and claims the benefit of priority of the prior Japanese Patent Application No. 2015-051397 filed on Mar. 13, 2015, the entire contents of which are incorporated herein by reference.

FIELD

A certain aspect of the embodiments is related to an electronic device, a power feeding device and an electronic device system.

BACKGROUND

Various electronic devices driven by batteries are used widely. A portable printer which is used to print a receipt and a check at a desired place is known as an example of such an electronic device. In addition, many portable information processing devices such as so-called hand held terminals are used.

In these electronic devices, there are many devices equipped with charge-type batteries. To charge the battery of the electronic device, the electronic device is connected to a charging apparatus (i.e., a battery charger) which functions as a power feeding device. The electronic device can be seen as a device to be charged, and includes a charging electrode. On the other hand, a terminal that contacts the electrode of the electronic device is provided in the battery charger.

A battery charger called a cradle is known as an example of the battery charger (see Japanese National Publication of International Patent Application No. 2014-521305). When the electronic device is charged, the electronic device is put on the cradle. Thereby, the electrode of the electronic device contacts the terminal provided in the cradle, and the charge to the electronic device is started.

Here, the cradle is not necessarily used for a charge function. A cradle having a data transmission function between the cradle (or other electronic device to which the cradle is connected) and the electronic device exists.

SUMMARY

According to a first aspect of the present invention, there is provided an electronic device that is driven by a battery and is capable of being attached to a power feeding device that feeds power to the electronic device, including: a surface opposite to the power feeding device when the electronic device is attached to the power feeding device; an electrode provided on the surface; and any one of a groove and a projection provided on the surface.

According to a second aspect of the present invention, there is provided a power feeding device that feeds power to an electronic device, including: a surface opposite to the electronic device when the electronic device is attached to the power feeding device; a feeding terminal projected from the surface; and a projection projected from the surface.

According to a third aspect of the present invention, there is provided an electronic device system including: an electronic device that is driven by a battery, and includes an electrode provided on a surface; a power feeding device to which the electronic device is capable of being attached, and that includes a feeding terminal contactable with the electrode, the feeding terminal being provided on another surface opposite to the surface of the attached electronic device; wherein one of the surface of the electronic device and the another surface of power feeding device includes a projection, the other of the surface of the electronic device and the another surface of power feeding device includes a groove into which the projection is inserted, and at least one of the electrode or the feeding terminal is projected from a corresponding surface.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

When the charge terminal provided in the above-mentioned cradle is exposed, the charge terminal may be rubbed, which may cause contact failure of the charge terminal.

A description will now be given of embodiments of an electronic device according to the present invention. Hereinafter, a portable printer is explained as an example of the electronic device. Also, the embodiments described later are merely examples.

First, based on FIGS. 1A and 1B, a description will be given of a situation where the electronic device that is a device to be charged is put on a battery charger (i.e., a cradle).

Figure 1A:
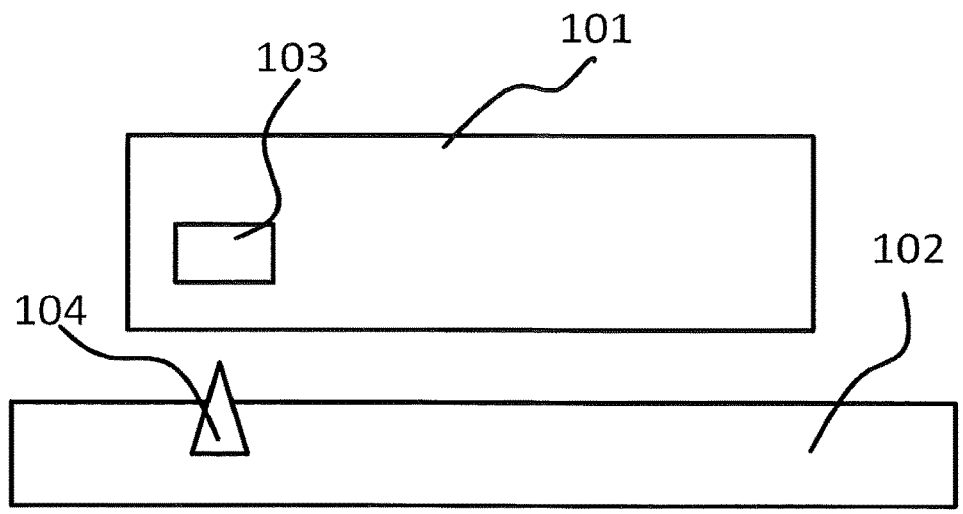
FIGS. 1A and 1B are diagrams illustrating a mounting state of an electronic device to a battery charger.
Figure 1B:
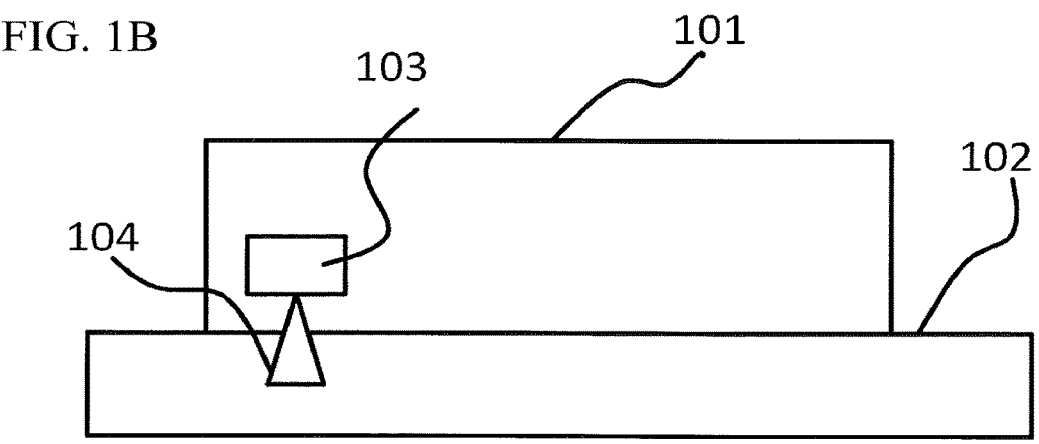

FIGS. 1A and 1B illustrate a situation where an electronic device 101 is charged by putting the electronic device 101 on a surface of a battery charger 102.

In FIGS. 1A and 1B, a charge terminal 104 is provided on an upper surface of the battery charger 102, and an electrode 103 is provided on a lower surface of the electronic device 101. The electronic device 101 is put on the battery charger 102, so that the electrode 103 contacts the charge terminal 104.

In the situation of FIGS. 1A and 1B, the electrode 103 of the electronic device 101 is opposite to the charge terminal 104 in a direction where self-weight of the electronic device 101 is applied. Therefore, a shape of the battery charger 102 can be made simple.

However, since the electronic device 101 is put on the upper surface of the battery charger 102, a large installation area is required in order to put the battery charger 102, particularly. For this reason, there is a possibility that a position where the electrode 103 of the electronic device 101 is provided is limited.

Figure 2A:
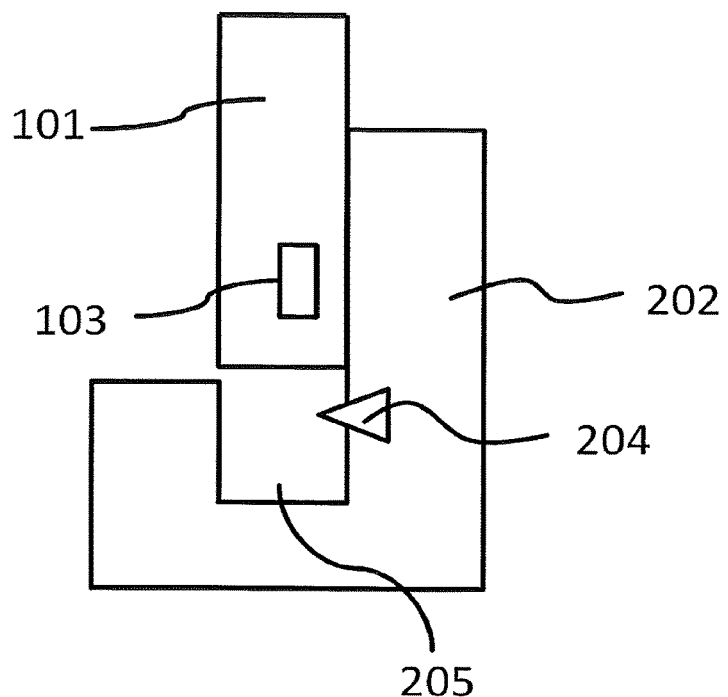
FIGS. 2A and 2B are diagrams illustrating a mounting state of the electronic device to another battery charger.
Figure 2B:
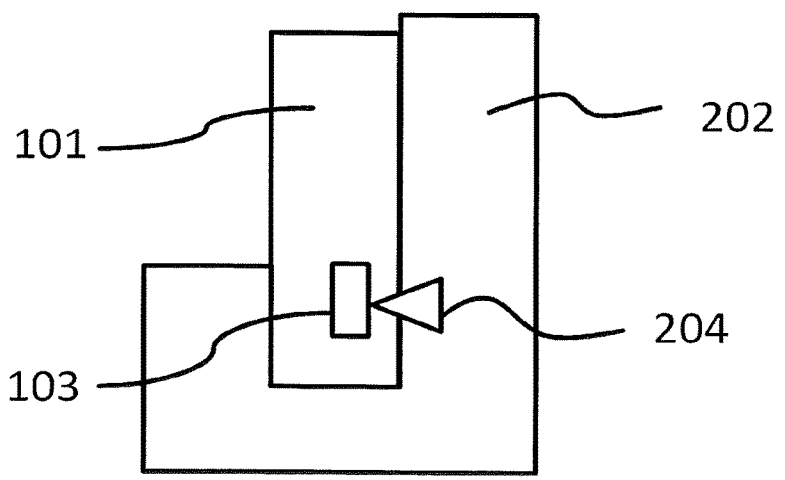

In an example of FIGS. 2A and 2B, a concave portion 205 for putting the electronic device 101 is formed on a battery charger 202, and hence the electronic device 101 is vertically attached to the battery charger 202. By making the battery charger 202 into such a shape, the installation area of the battery charger 202 can be reduced.

In the example of FIGS. 2A and 2B, the electrode 103 is provided at a right side of the electronic device 101 in a direction vertical to the direction where the self-weight of the electronic device 101 is applied. Correspondingly, a charge terminal 204 of the battery charger 202 is provided at a position, on a left surface of a right wall of the battery charger 202, which is opposite to the electrode 103.

When the electronic device 101 is attached to the battery charger 202, it is necessary to make the electrode 103 contact the charge terminal 204. For this reason, the charge terminal 204 is slightly projected from a side surface (i.e., the left surface of the right wall) of the battery charger 202. In such a shape of the charge terminal 204, the charge terminal 204 is always exposed from the battery charger 202. Therefore, when the electronic device 101 is attached to the battery charger 202, the electronic device 101 is inserted into the concave portion 205 while rubbing against the charge terminal 204. For this reason, the housing of the electronic device 101 may be damaged by the contact with the charge terminal 204. Moreover, the charge terminal 204 rubbed by the electronic device 101 may be worn away. Also, a dust attaches to the exposed charge terminal 204, and hence the contact failure between the charge terminal 204 and the electrode 103 may be caused.

As measures to these problems, it is considered that provided in the battery charger is a mechanism which retracts the charge terminal into the wall surface of the battery charger when the electronic device is not attached to the battery charger, and projects the charge terminal from the wall surface of the battery charger when the electronic device is attached to the battery charger. In such a battery charger, a button member which is pushed by the self-weight of the attached electronic device is provided on the wall surface, and the charge terminal can be projected from the wall surface when the button member is pushed.

By such a configuration, the charge terminal is not ordinarily exposed, and hence it is possible to prevent the electrode from rubbing against the charge terminal. However, the mechanism for putting the button member and the charge terminal in and out needs to be provided in the battery charger, and hence the structure of the battery charger becomes complicated.

Figure 3:
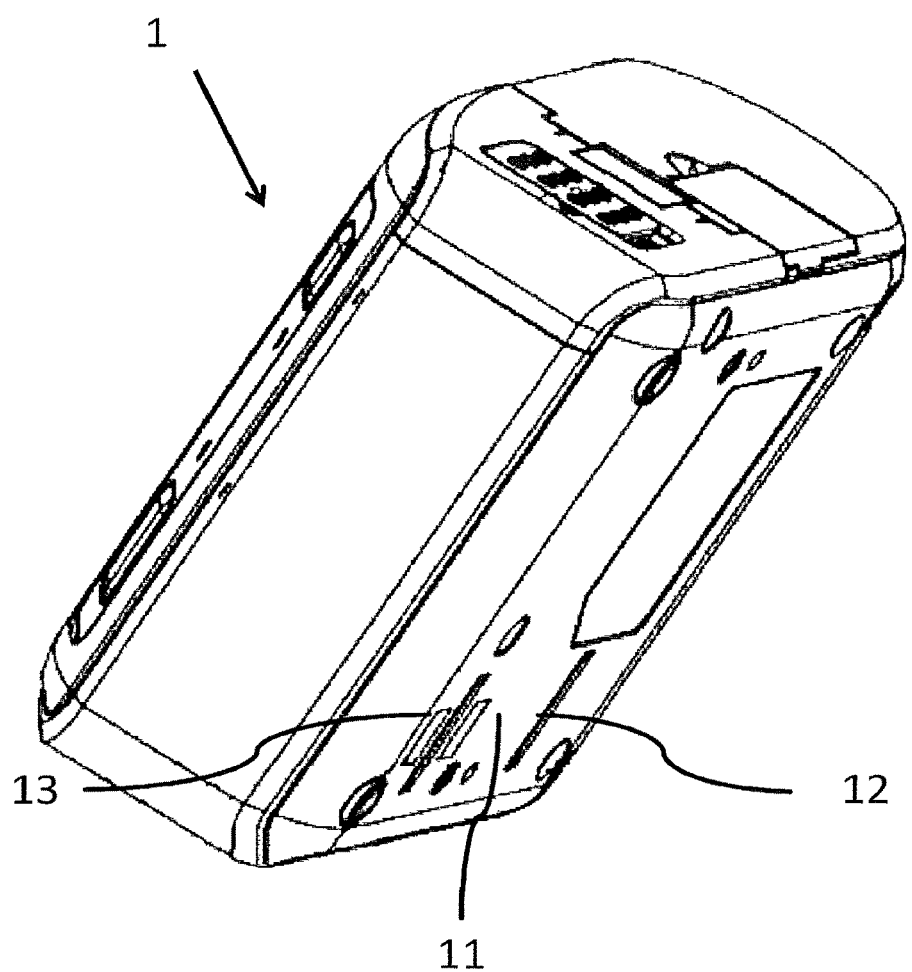
FIG. 3 is an external view of a printer according to an embodiment.
Figure 4:
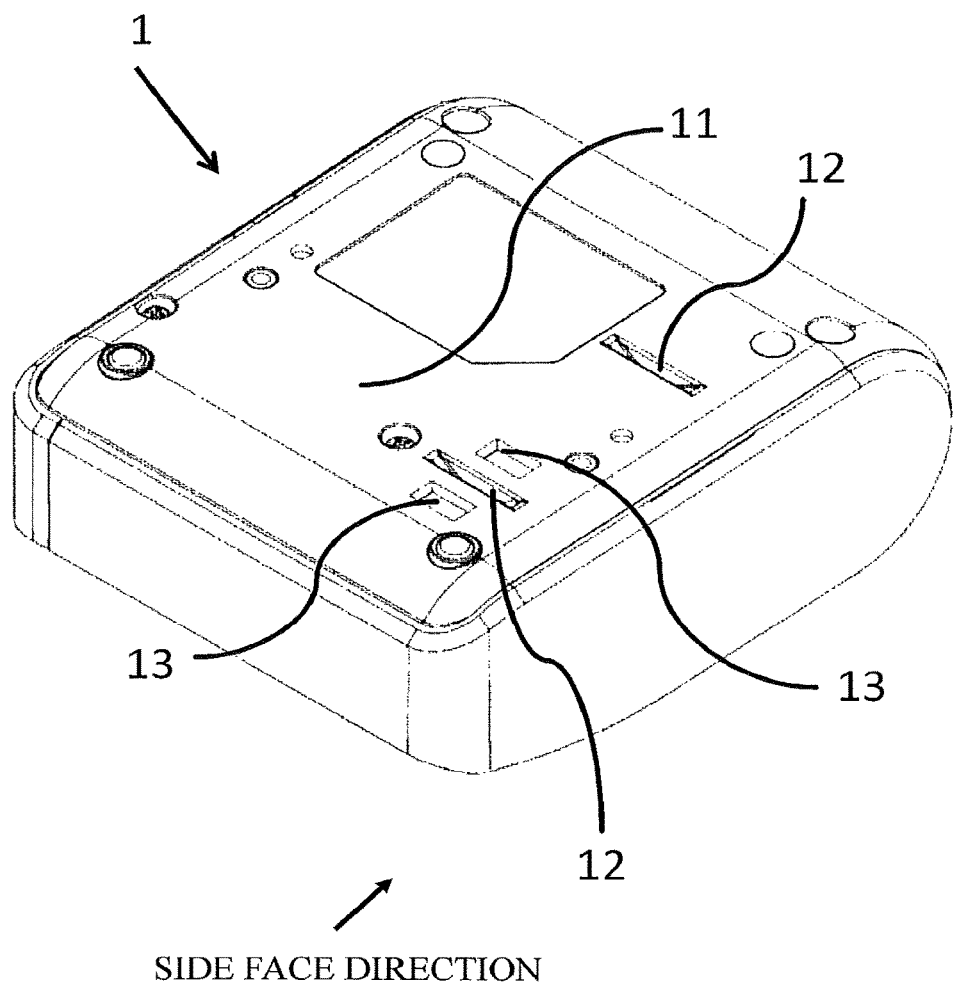
FIG. 4 is a perspective view illustrating a bottom surface of the printer.
Figure 5:
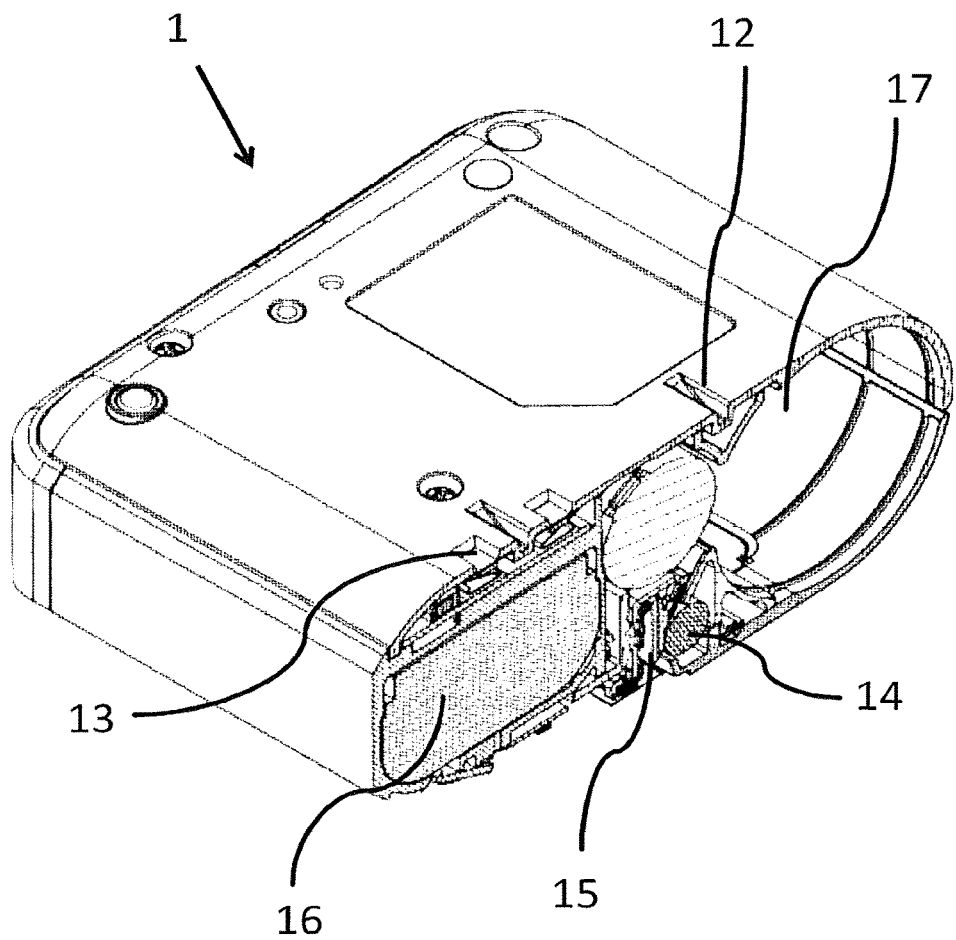
FIG. 5 is a perspective view illustrating a cross-section surface of the printer.
Figure 6:
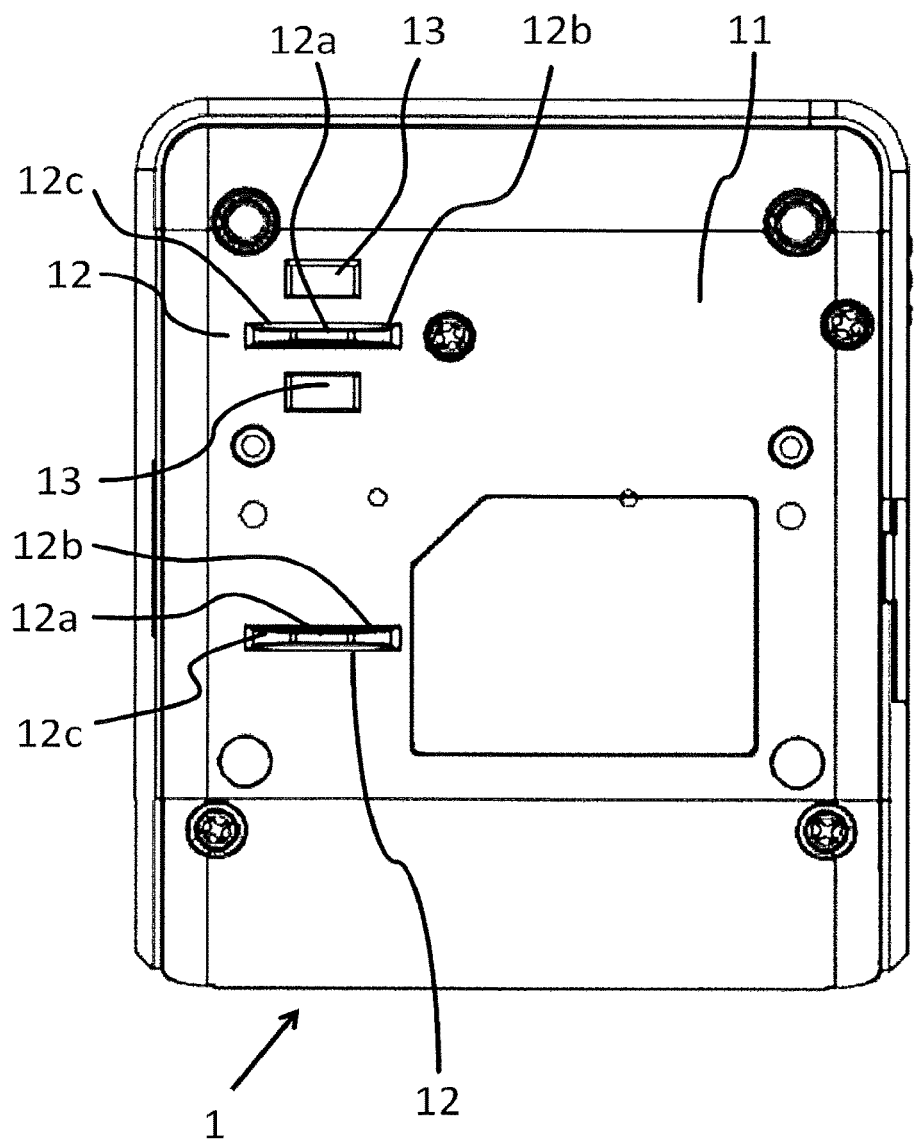
FIG. 6 is a view illustrating a bottom surface of the printer.
Figure 7:
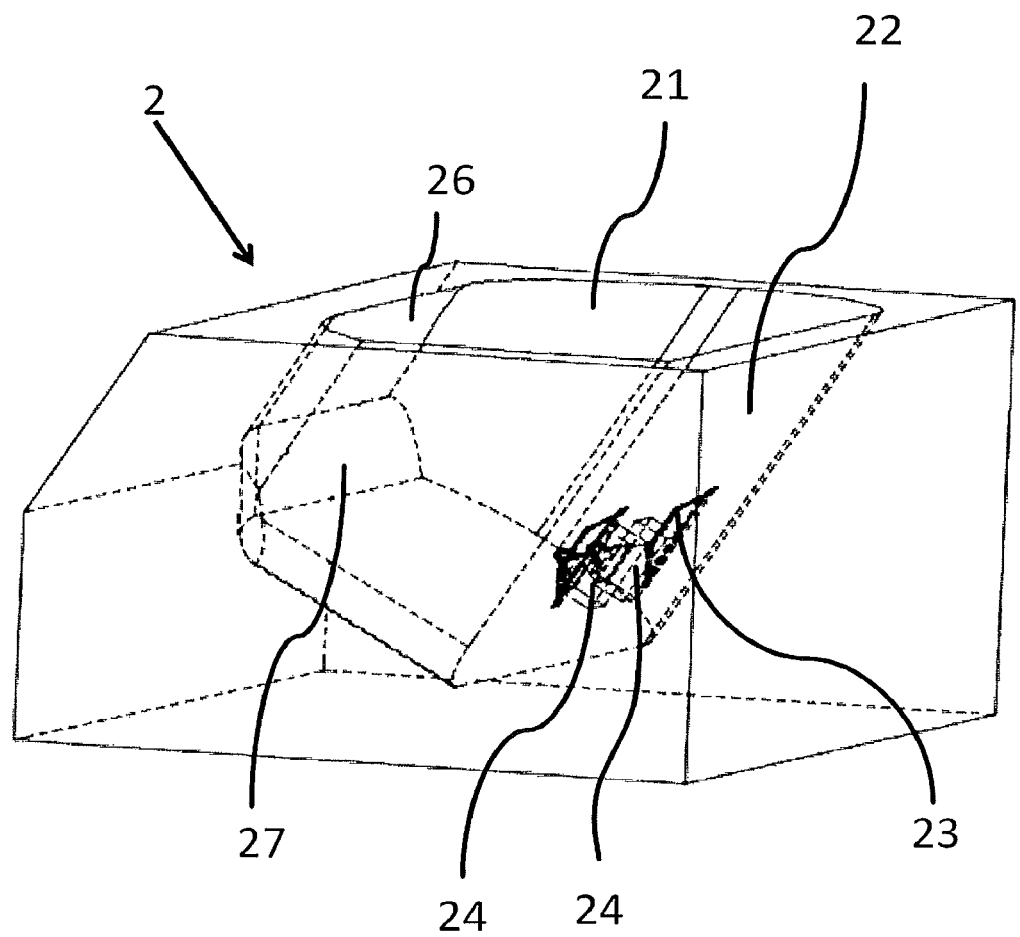
FIG. 7 is a view illustrating a cradle according to an embodiment.
Figure 8:
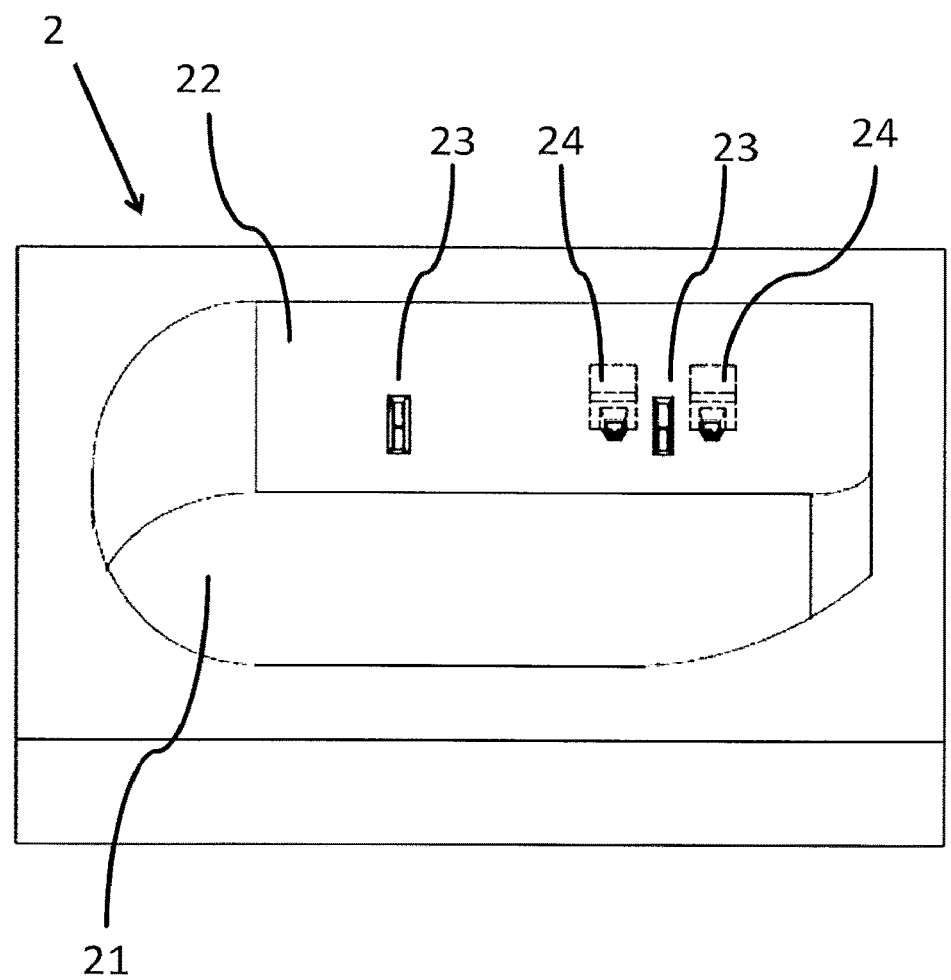
FIG. 8 is a perspective view illustrating an attachment portion of the cradle to which the printer is attached.
Figure 9:
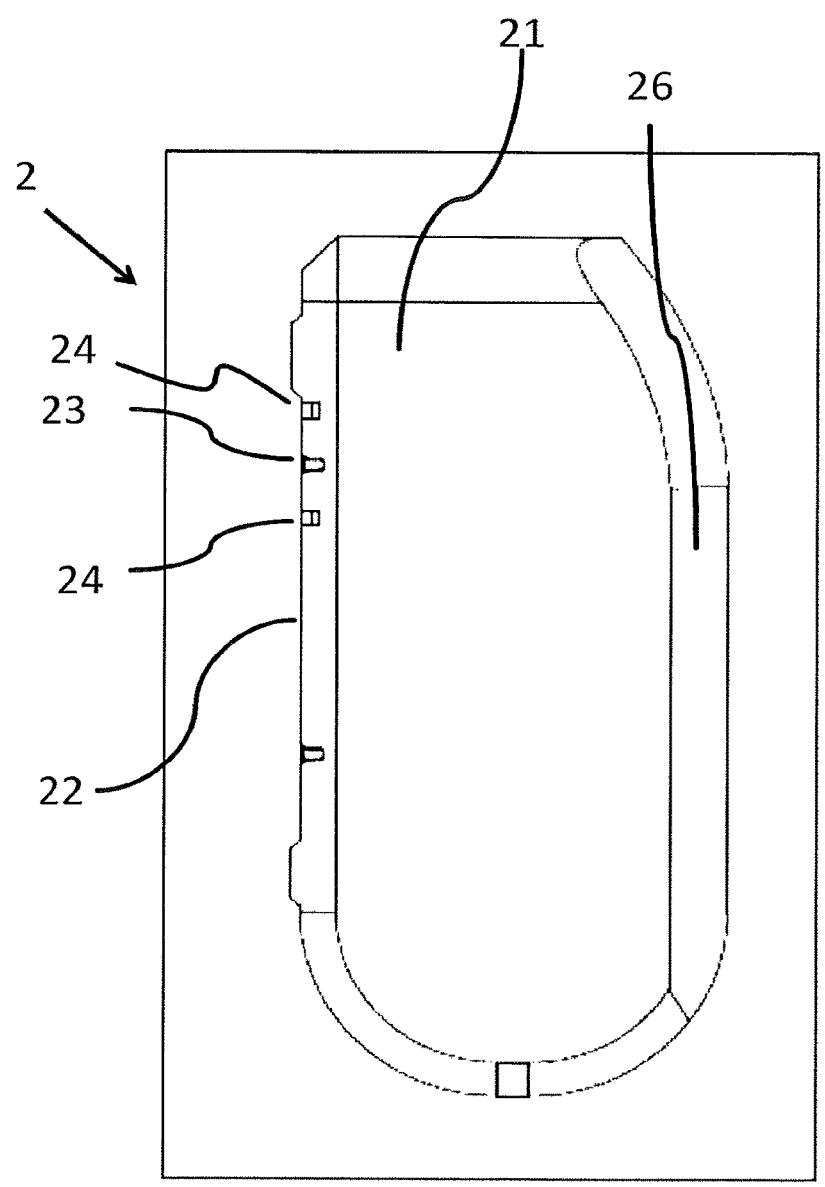
FIG. 9 is a perspective view illustrating the attachment portion of the cradle as viewed from above.
Figure 10:
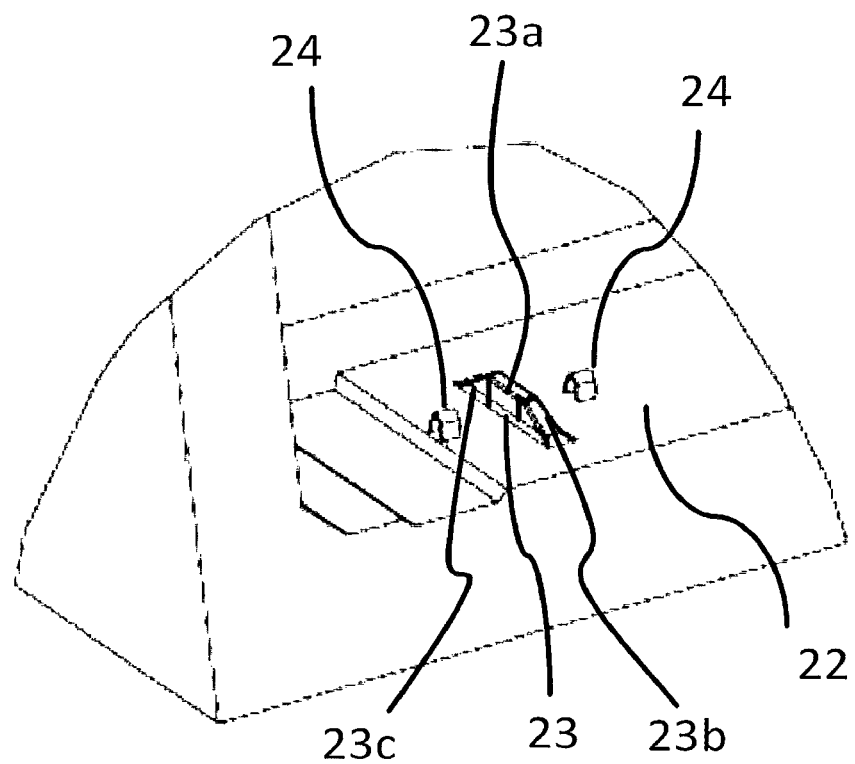
FIG. 10 is a partial enlarged view of the attachment portion of the cradle.

FIG. 3 is an external view of a printer according to an embodiment of the present invention. FIG. 4 is a perspective view illustrating a bottom surface of the printer illustrated in FIG. 3. FIG. 5 is a perspective view illustrating a cross-section surface of the printer illustrated in FIG. 4. FIG. 6 is a view illustrating the bottom surface of the printer. FIG. 7 is a view illustrating a cradle according to the embodiment. FIG. 8 is a perspective view illustrating an attachment portion of the cradle to which the printer is attached. FIG. 9 is a perspective view illustrating the attachment portion of the cradle as viewed from above. FIG. 10 is a partial enlarged view of the attachment portion of the cradle.

Hereinafter, a description will be given of the printer and the cradle according to the embodiment, with reference to the drawings.

A printer 1 which is an example of the electronic device according to the embodiment is a portable printer driven by a battery. Here, the following disclosure does not necessarily mean that the electronic device is limited to the printer. As illustrated in FIG. 5, provided in the printer 1 are a print head 15 composed of a thermal head and the like, a transfer portion that includes a platen roller 14 transferring a sheet, a storage portion 17 that stores a rolled paper (i.e., the sheet), and a control portion (not shown) that controls the printer 1. A charge type battery 16 is stored into the printer 1.

The printer 1 can be put on a table by directing downward a bottom surface 11 illustrated in FIG. 4. At this time, projections which become legs are provided on the bottom surface 11 to stably support the printer 1.

The sheet stored into the storage portion 17 is conveyed, and data is printed on the sheet by the print head 15. The sheet to be conveyed passes through a gap between the print head 15 and the platen roller 14, and is ejected from a sheet ejection port provided on the printer 1.

On the bottom surface 11 of the printer 1, two charge electrodes 13 are provided. These electrodes 13 are connected to the battery 16 in the inside of printer 1. Here, as illustrated in FIGS. 4 and 5, portions of the bottom surface 11 on which the electrodes 13 are provided are concave portions, and the electrodes 13 are provided at deep positions from the bottom surface 11 of the printer 1.

In an example of FIGS. 4 and 6, two grooves 12 are formed on the bottom surface 11. Looking from a lateral direction, each of the grooves 12 is formed in the shape of almost a trapezoid. Each groove 12 is formed so that a center part of the groove 12 is the deepest and a depth of the groove 12 gradually shallows toward both ends of the groove 12 (i.e. both ends in a right and left direction of FIG. 6). In FIG. 6, the groove 12 is divided into three areas by lines drawn in an up-and-down direction. An area (i.e. a central area) 12a of the central part is a deepest area in the groove 12. In the present embodiment, the central area 12a is flat and the depth of the central area 12a is equal anywhere. Areas 12b and 12c located in the right and the left of the central area 12a incline linearly so that the depths of the areas 12b and 12c become shallow, relative to the bottom 11, as they extend from the central area 12a. FIG. 5 illustrates that a bottom surface of the groove 12 inclines. The two grooves 12 are arranged on the bottom surface 11 in parallel with each other.

As illustrated in FIG. 6, a position of the deepest central area 12a in the groove 12 is adjacent to the positions where the electrodes 13 are provided. That is, the central areas 12a in the grooves 12 and the central parts of the two electrodes 13 are arranged on a straight line (not shown) extending up and down in FIG. 6. Here, the depth of each groove 12 on the central area 12a is formed deeper than a depth from the bottom surface 11 of the printer 1 to the electrodes 13.

FIG. 7 illustrates a cradle 2 according to the embodiment. In FIG. 7, a part of the internal structure of the cradle 2 is penetrated to make it easier to understand the internal structure of the cradle 2.

The cradle 2 functioning as the battery charger has a box-like shape.
A hollow attachment portion 21 to which the printer 1 is attached is formed in the cradle 2. A cross section of the attachment portion 21 becomes a shape corresponding to almost the cross section of the printer 1. The printer 1 is attached to the cradle 2 from above the attachment portion 21. Here, the attachment portion 21 is formed in a direction slightly inclined against a vertical direction of FIG. 7.

As illustrated in FIGS. 7 to 10, two charge terminals 24 are provided on a surface 22 of the attachment portion 21. The surface 22 is a surface to which the self-weight of the printer attached to the cradle 2 is applied. As illustrated in FIGS. 9 and 10, each of the charge terminals 24 is formed so as to project from the surface 22. Moreover, the respective charge terminals 24 are provided at positions opposite to the electrodes 13 in a state where the printer 1 is attached to the cradle 2.

Also, two projections 23 are formed on the surface 22 of the cradle 2. The two projections 23 are formed in parallel with each other. Specifically, as illustrated in FIG. 10, each of the projections 23 is formed in the shape of a trapezoid, and is mainly divided into three areas. In these areas, a central area 23a is the highest and the top of the central area 23a is flat. Areas 23b and 23c located in both sides of the central area 12a incline linearly so that the heights of the areas 23b and 23c reduce gradually toward both ends of each projection 23 from the central area 23a. The two respective projections 23 are provided at positions opposite to the grooves 12 in a state where the printer 1 is attached to the cradle 2. Here, the central area 23a of each projection 23 is formed higher than the charge terminals 24.

Figure 11:
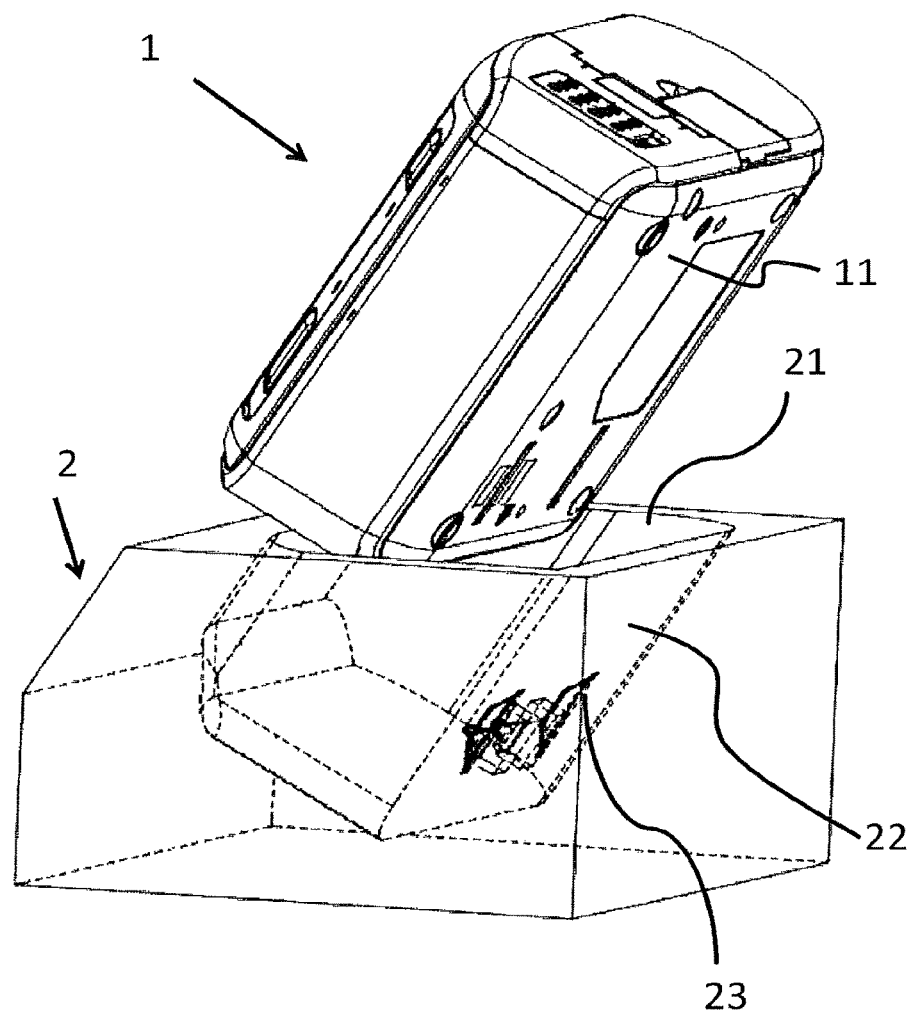
FIG. 11 is a diagram illustrating a state before the printer is attached to the cradle.
Figure 12:
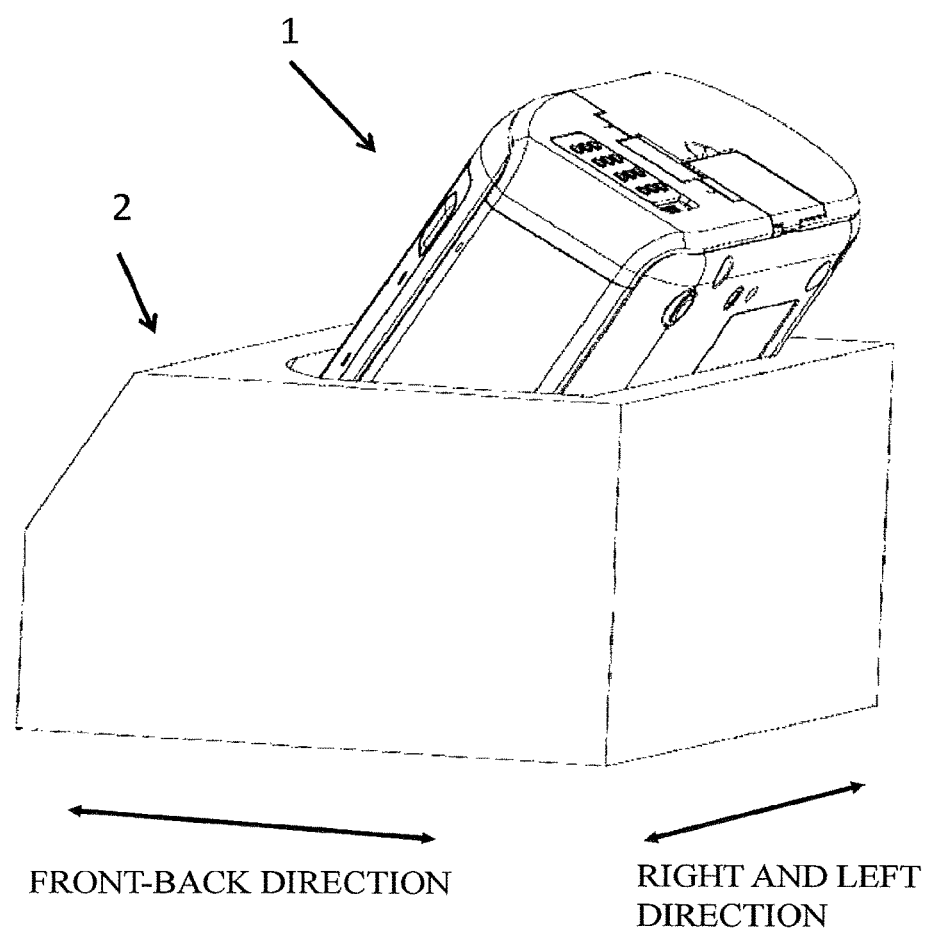
FIG. 12 is a diagram illustrating a state where the printer is attached to the cradle.
Figure 13:
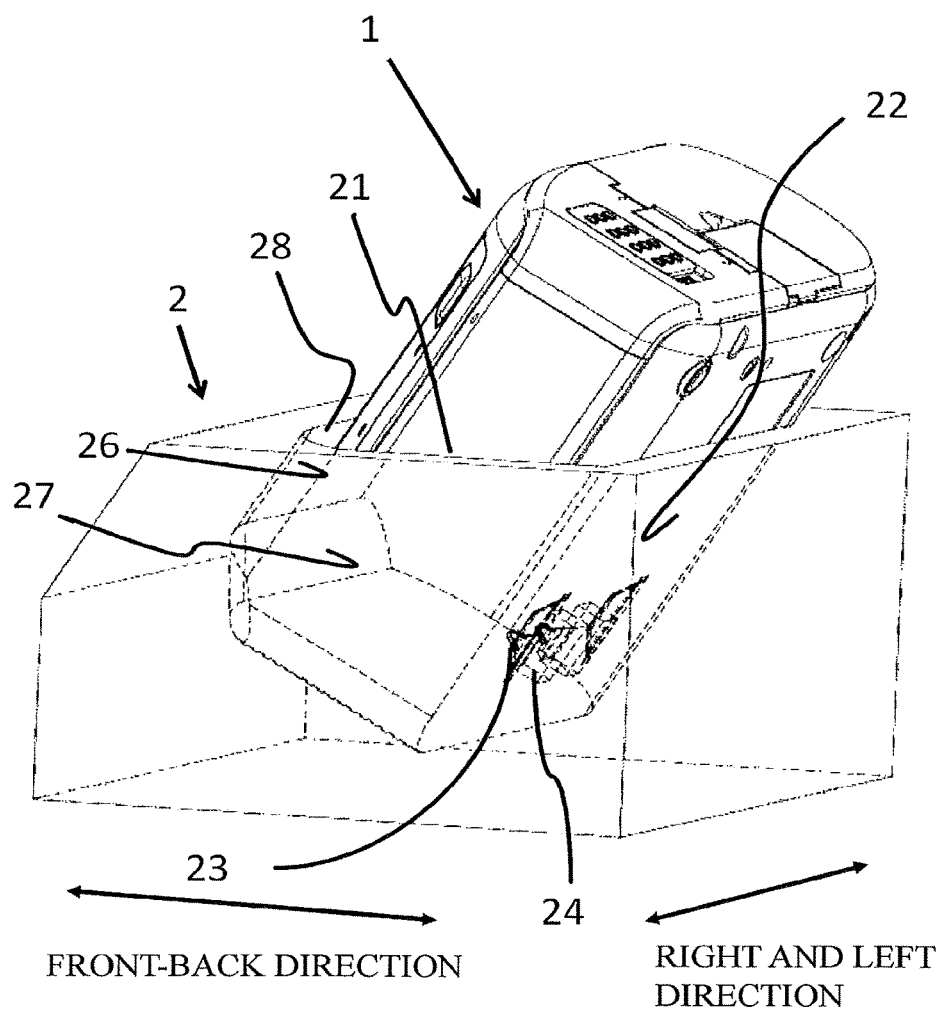
FIG. 13 is a diagram illustrating a state where the printer is attached to the cradle.

FIG. 11 is a diagram illustrating a state before the printer 1 is attached to the cradle 2. FIGS. 12 and 13 are diagrams illustrating a state where the printer 1 is attached to the cradle 2. FIG. 13 is a partial transparent diagram.

The printer 1 is attached to the attachment portion 21 of the cradle 2 so as to slightly incline to a right side of FIG. 11 against the cradle 2. In this case, the printer 1 gradually declines along the surface 22.

At this time, the bottom surface 11 of the declining printer 1 contacts the projections 23. Thereby, the printer 1 is guided to the left side of FIG. 11 by the projections 23. Since the projections 23 are higher than the charge terminals 24, a housing of the printer 1 lifted by the projections 23 does not contact the charge terminals 24, which prevents the printer 1 from rubbing against the charge terminals 24.

Moreover, when the printer 1 declines, the projections 23 are fitted in the grooves 12. Thereby, the upper surfaces of the projections 23 contact the bottom surfaces of the grooves 12. Since the grooves 12 and the projections 23 are formed in the shape of a mountain, the printer 1 is guided by the projections 23 depending on the contact of the projections 23 and the grooves 12, and the declining printer 1 gradually approaches the surface 22. Then, when the highest parts (i.e., the central areas 23a) of the projections 23 reach the deepest positions (i.e., the central areas 12a) of the grooves 12, the printer 1 gets closest to the surface 22.

The grooves 12 are formed deeper than the depths of the electrodes 13. When the grooves 12 of the printer 1 reach the projections 23, the electrodes 13 contact the charge terminals 24 and the charge to the printer 1 is started.

When the printer 1 is removed from the cradle 2, the contact positions of the projections 23 and the grooves 12 are changed by pulling out the printer 1 upward, and the printer 1 is gradually moved away from the surface 22. Depending on this, the contact state of the electrodes 13 and the charge terminals 24 is also released.

When the printer 1 is further pulled out upward, the projections 23 are removed from the grooves 12 and contact the bottom surface 11 of the printer 1. Thereby, the printer 1 is further away from the surface 22. The projections 23 guide the printer 1, so that the printer 1 to be pulled out upward can be removed from the cradle 2 without contacting the charge terminals 24. Therefore, it is possible to prevent the printer 1 from rubbing against the charge terminals 24.

The projections 23 have a function which guides the printer 1 so that the charge terminals 24 contact the electrodes 13 well. The width of the attachment portion 21 of the cradle 2 almost corresponds to the width of the printer 1, but it is considered to make the width of the attachment portion 21 slightly larger than the width of the printer 1 so as to be able to attach the printer 1 more easily. In this case, the printer 1 to be attached to the cradle 2 deviates in the right and left direction, and there is a possibility that the charge terminals 24 do not contact the electrodes 13 well even when the printer 1 is attached to the cradle 2.

However, in the present embodiment, when the printer 1 is attached to the cradle 2, the projections 23 come in the grooves 12, the printer 1 is guided in the right and left direction by the projections 23, and hence the printer 1 can be led to the positions where the electrodes 13 contact the charge terminals 24.

Here, the depths of the grooves 12 and the heights of the projections 23 may be formed so that the electrodes 13 and the charge terminals 24 can keep a good contact state when the highest parts of the projections 23 are located on the deepest parts of the grooves 12.

When a hardness of a material constituting a housing of the printer 1 is different from a hardness of a material constituting a housing of the cradle 2, the printer 1 contacts the cradle 2 and rubs against the cradle 2 in attaching the printer 1 to the cradle 2, and hence one of the housings may wear away. For this reason, it is desirable that the material constituting the housing of the printer 1 and the material constituting the housing of the cradle 2 have almost the same hardness as each other.

In the above-mentioned embodiment, the grooves 12 and the projections 23 are formed in the shape of the trapezoid. However, as long as the charge terminals 24 do not contact the printer 1 in inserting the printer 1 into the cradle 2, and the electrodes 13 contact the charge terminals 24 when the electrodes 13 of the printer 1 reach the positions of the charge terminals 24, the grooves 12 and the projections 23 may be formed in a shape other than the trapezoid. The grooves 12 and the projections 23 can be arbitrarily formed in a shape, such as an arc-like shape including a semicircle, a triangle, a rectangle, or the like. The grooves 12 and the projections 23 do not necessarily have to be the same shape.

If it is possible to prevent the charge terminals 24 from contacting the printer 1 needlessly, the shape of the projections 23 may be different from the shape of the grooves 12. For example, the projections 23 may be the triangle, and the grooves 12 may be the rectangle.

Moreover, in the above-mentioned embodiment, the two grooves 12 and the two projections 23 may be provided. However, if unnecessary contact of the charge terminals 24 to the printer 1 can be avoided, the number of grooves 12 and projections 23 does not need to be two. In this regard, when a single projection 23 supports the printer 1 to be attached to the cradle 2, if a possibility that the printer 1 inclines in the attachment portion 21 and touches the charge terminals 24 is removed as much as possible, it is desirable that the plurality of projections 23 support the housing of the printer 1.

Figure 14:
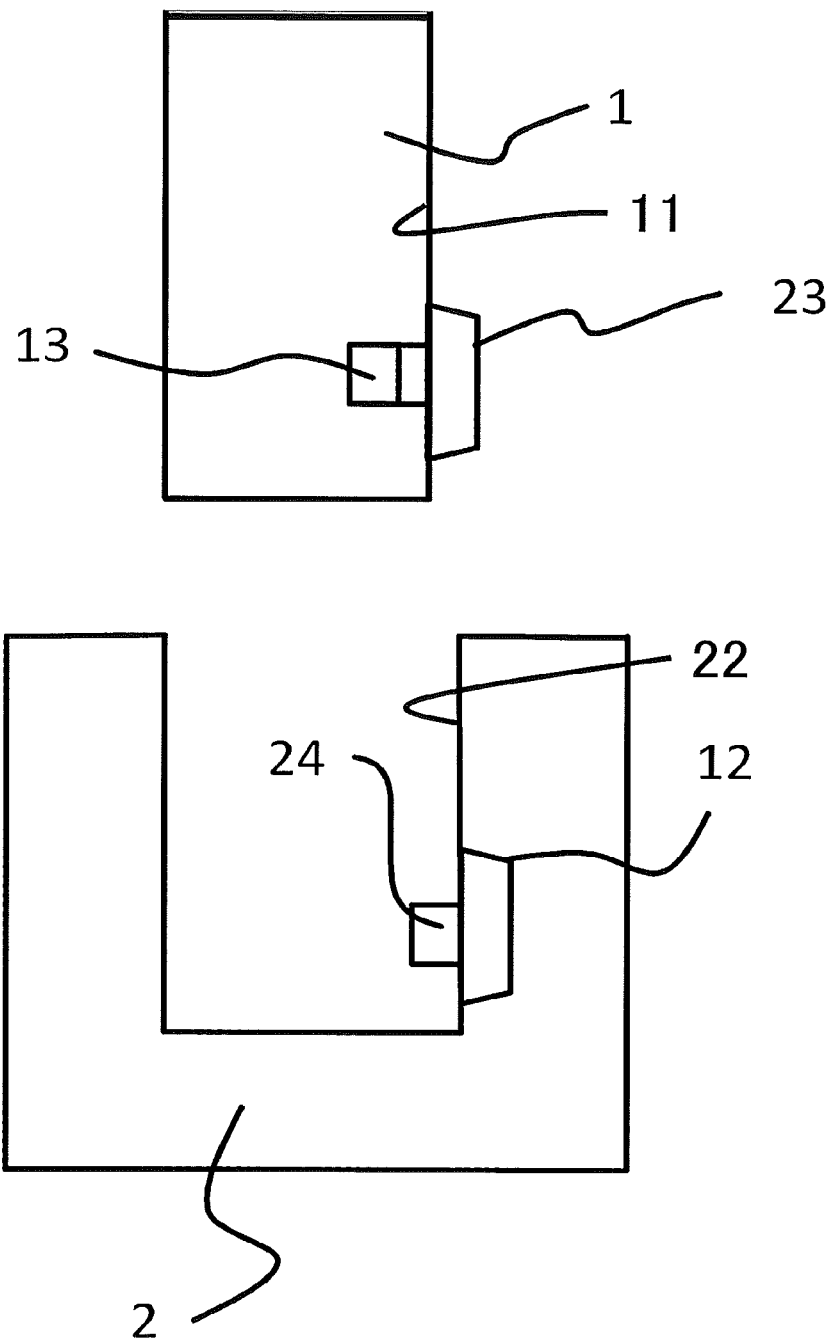
FIG. 14 is a diagram illustrating a first variation example of the printer and the cradle according to the embodiment.

FIG. 14 schematically illustrates the printer and the cradle according to another example. As illustrated in FIG. 14, the projections 23 may be provided on the printer 1, and the grooves 12 may be provided on the cradle 2. Here, when the charge terminals 24 of the cradle 2 are projected and the electrodes 13 of the printer 1 are provided at the deep positions from the bottom surface 11 of the printer 1, the grooves 12 to be formed on the cradle 2 are formed deeper than the depths of the electrodes 13. Similarly, the projections 23 of the printer 1 are formed higher than the heights of the charge terminals 24 of the cradle 2. Here, essentially, the electrodes 13 of the printer 1 may be projected and the charge terminals 24 of the cradle 2 may be provided at the deep positions from the surface 22 of the cradle 2.

In the above-mentioned embodiment, the projections 23 guide the printer 1 so that the printer 1 is away from the surface 22 on which the charge terminals 24 are provided. However, in order to attach the printer 1 to the cradle 2 without a trouble, a clearance 28 in which the printer 1 can move in a front-back direction is required in the front-back direction (i.e., a direction that intersects the surface 22 on which the charge terminals 24 are provided) of the attachment portion 21 (see FIG. 13). When such a clearance 28 is provided in the attachment portion 21, the printer 1 to be attached to the cradle 2 moves in the front-back direction in the attachment portion 21, the contact state of the electrodes 13 and the charge terminals 24 is released, and hence the charge may not be performed appropriately.

For this reason, a guide that guides the printer 1 to be attached to the cradle 2 toward the charge terminals 24 may be provided on another surface 26 of the cradle 2. The guide can prevent the movement of the printer 1 in the front-back direction in the attachment portion 21.

Figure 15A:
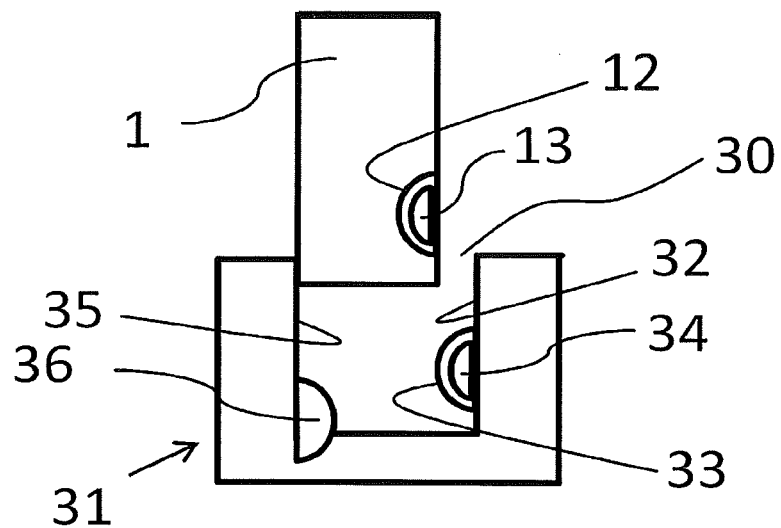
FIGS. 15A to 15C are diagrams explaining an attachment process of the printer to the cradle according to a second variation example.
Figure 15B:
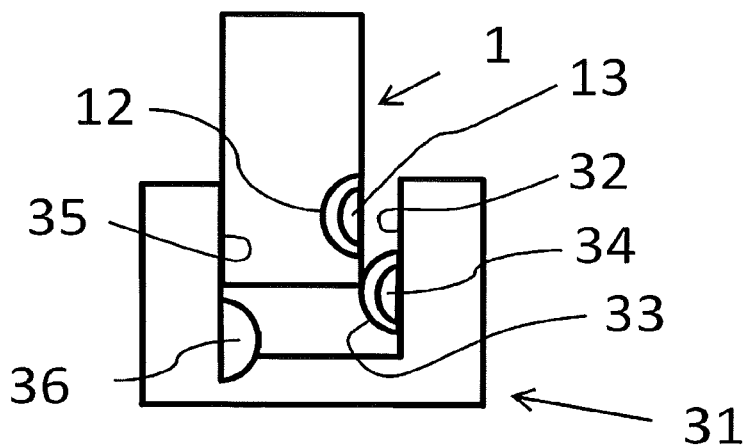
Figure 15C:
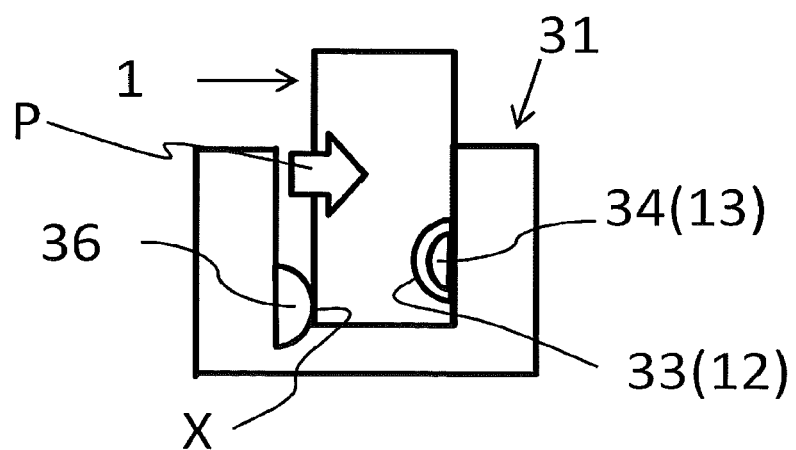

FIGS. 15A to 15C schematically illustrate an attachment state of the printer 1 to a cradle 31. FIG. 15A illustrates a state before the start of the attachment of the printer 1 to the cradle 31. FIG. 15B illustrates an ongoing state where the printer 1 is attached to the cradle 31. FIG. 15C illustrates a state where the printer 1 has been attached to the cradle 31.

As illustrated in FIGS. 15A to 15C, the printer 1 includes the grooves 12 and the electrodes 13. Here, the numbers of grooves 12 and electrodes 13 are the same as those of FIG. 4. The cradle 31 includes: a hollow attachment portion 30 to which the printer 1 is attached; a surface 32 having charge terminals 34 and projections 33 to be received in the grooves 12; and a surface 35 that has a guide 36 and is opposite to the surface 32. The guide 36 guides the printer 1 toward the projections 33. The attachment portion 30 is surrounded with the surfaces 32 and 35.

By lowering the printer 1 from the state of FIG. 15A, the projections 33 contact the housing of the printer 1 as illustrated in FIG. 15B. Thereby, the printer 1 is guided in a direction away from the charge terminals 34. Then, the projections 33 get into the grooves 12, so that the printer 1 can be guided in a direction approaching the charge terminals 34.

At nearly the same timing as when the projections 33 get into the grooves 12, the mountain-like guide 36 provided on the surface 35 touches the housing of the printer 1. The printer 1 is guided in the direction (i.e., a right direction of FIG. 15) approaching the charge terminals 34 by the guide 36, as illustrated by an arrow P of FIG. 15C.

When the printer 1 is attached to the cradle 31, a highest portion X of the guide 36 contacts the printer 1, and the position of the printer 1 is kept in the direction approaching the charge terminals 34. Thereby, it is possible to keep the good contact state of the electrodes 13 and the charge terminals 34.

When the projections 33 interfere with the printer 1 at a stage where the insertion of the printer 1 into the attachment portion 30 is started, the attachment of the printer 1 is affected. Therefore, the width of the front-back direction (i.e., the right and left direction of FIG. 15) of the attachment portion 30 needs to have a width corresponding to a total of the height of the projections 33 and the width of the front-back direction of the printer 1. However, after the projections 33 start to get into the grooves 12, the printer 1 is brought close to the surface 32 side little by little. Therefore, the width of the front-back direction of the attachment portion 30 is gradually narrowed by the guide 36, which can stably support the printer 1 in a state of FIG. 15C.

In the transparent diagrams of FIGS. 7 and 13, a surface 27 near a lower end of the surface 26 opposite to the surface 22 of the attachment portion 21 is formed in a tapered shape. Since the tapered surface 27 can be contacted with a lower end of the printer 1 depending on the shape of the tapered surface 27, the tapered surface 27 can be provided with the same effect as the guide 36 of FIG. 15. The attachment portion 21 is surrounded with the surfaces 22, 26 and 27.

Figure 16A:
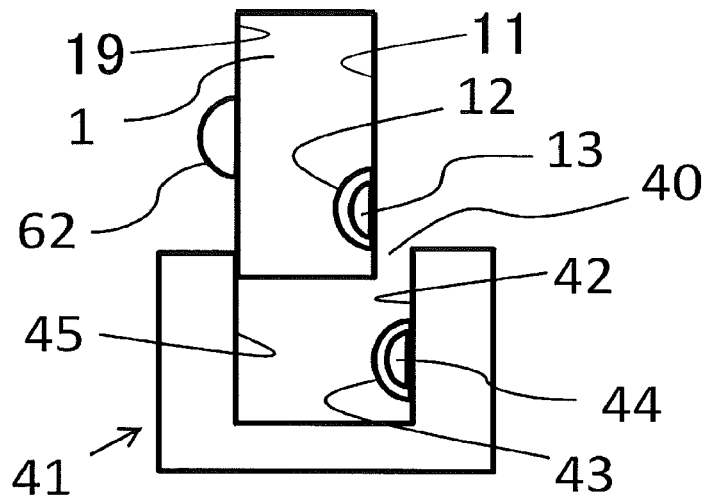
FIGS. 16A to 16C are diagrams explaining an attachment process of the printer to the cradle according to a third variation example.
Figure 16B:
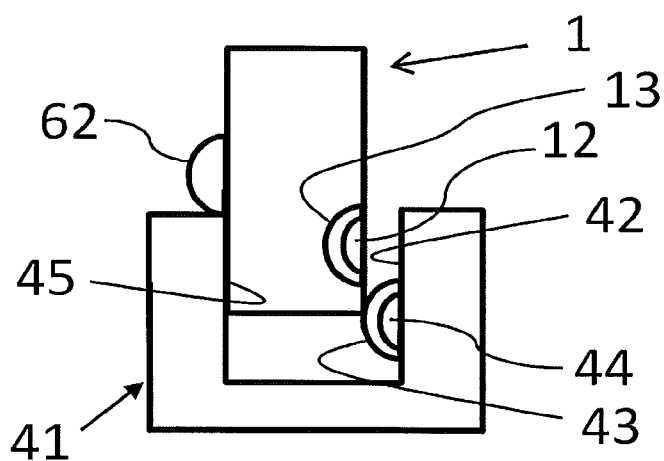
Figure 16C:
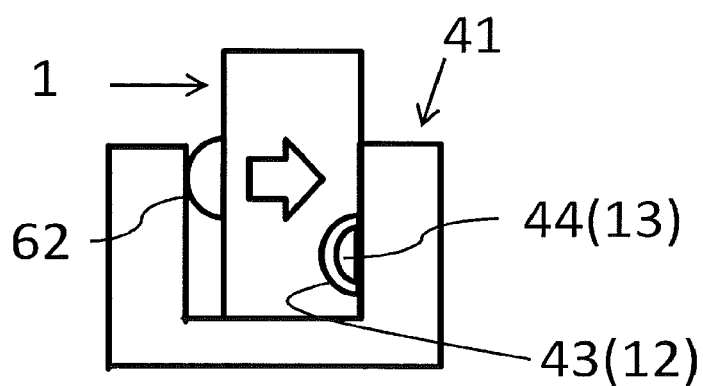

FIGS. 16A to 16C are variation examples of FIGS. 15A to 15C. A guide 62 is provided on the housing (i.e., a surface 19 opposite to the bottom surface 11) of the printer 1 in FIGS. 16A to 16C. Therefore, an element corresponding to the guide is not provided on a cradle 41. The printer 1 includes the grooves 12 and the electrodes 13. The cradle 41 includes: a hollow attachment portion 40 to which the printer 1 is attached; a surface 42 having charge terminals 44 and projections 43 to be got into the grooves 12; and a surface 45 opposite to the surface 42. The attachment portion 40 is surrounded with the surfaces 42 and 45.

As illustrated in FIG. 16B, the guide 62 contacts the surface 45 of the cradle 41 depending on the grooves 12 reaching the positions of projections 43. Then, the printer 1 is guided to the right side of FIG. 16B by the guide 62 contacting the surface 45 depending on the gradual lowering of the printer 1. When the printer 1 becomes a state of FIG. 16C, the printer 1 attached to the cradle 41 is supported appropriately.

Figure 17A:
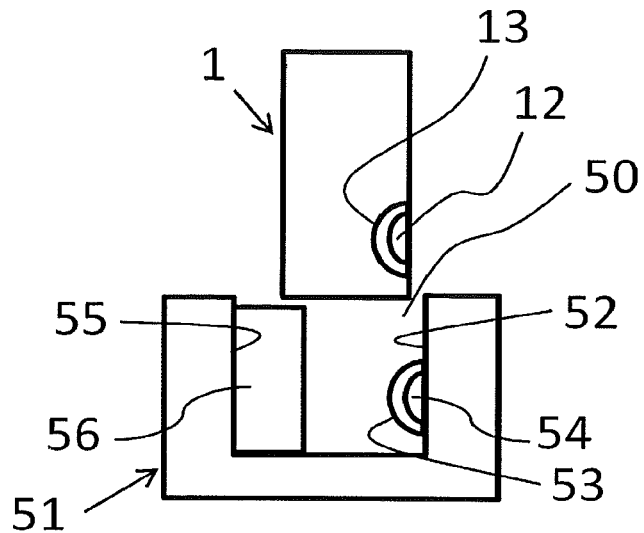
FIGS. 17A to 17C are diagrams explaining an attachment process of the printer to the cradle according to a fourth variation example.
Figure 17B:
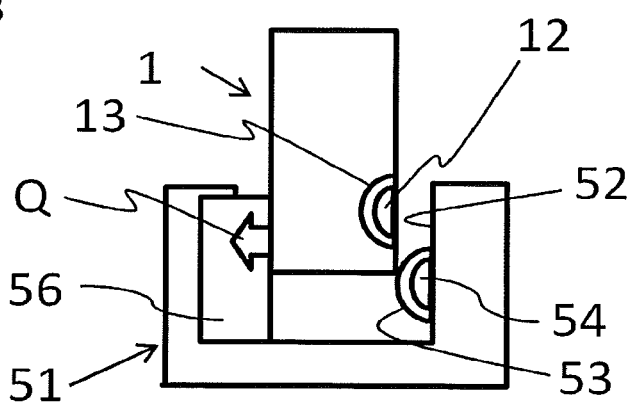
Figure 17C:
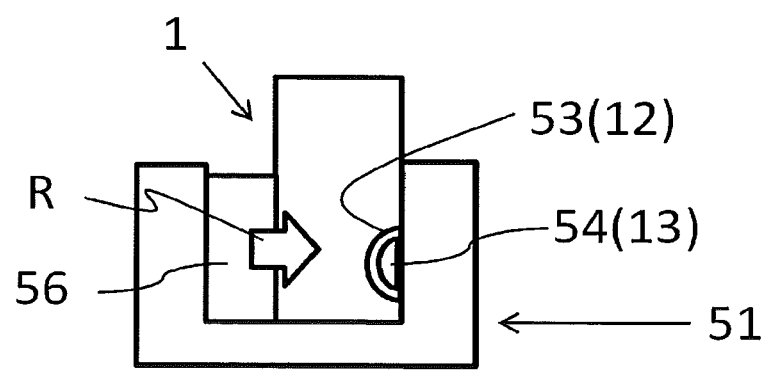

FIGS. 17A to 17C are diagrams explaining the attachment of the printer to the cradle according to other examples. The printer 1 includes the grooves 12 and the electrodes 13. The cradle 51 includes: a hollow attachment portion 50 to which the printer 1 is attached; a surface 52 having charge terminals 54 and projections 53 to be received in the grooves 12; and a surface 55 that is opposite to the surface 52 and has a biasing unit 56 which biases the printer 1 toward the charge terminal 54 side. The biasing unit 56 is an element which biases the printer 1 to the right side of FIG. 17A with an elastic body such as a spring. Here, the biasing unit 56 itself may be composed of a member having elasticity. The attachment portion 50 is surrounded with the surfaces 52 and 55.

As illustrated in FIG. 17A, the printer 1 is inserted into the cradle 51, so that the printer 1 contacts the biasing unit 56. In this state, when the printer 1 is pushed downward, the projections 53 contact the printer 1 as illustrated in FIG. 17B, the printer 1 is guided to the left side of FIG. 17B, and the biasing unit 56 is pushed in a direction of an arrow Q of FIG. 17B by the printer 1.

When the printer 1 is additionally pushed downward, the projections 53 are fitted in the grooves 12 as illustrated in FIG. 17C. In this case, the biasing unit 56 biases the printer 1 in a direction of an arrow R, so that the printer 1 is pushed against the surface 52. Thereby, it is possible to keep the good contact state of the electrodes 13 and the charge terminals 54.

According to the above-mentioned embodiments, when the printer 1 is attached to the cradle 2 (31, 41 or 51), the projections 23 (33, 43 or 53) can prevent the contact of the housing of the printer 1 and the charge terminals 24 (34, 44 or 54). Moreover, according to the above-mentioned embodiments, when the electrodes 13 provided on the printer 1 reach the positions corresponding to the charge terminals 24 (34, 44 or 54), the electrodes 13 can be contacted with the charge terminals 24 (34, 44 or 54).

When the projections 23 (33, 43 or 53) are formed near the charge terminals 24 (34, 44 or 54) of the cradle 2 (31, 41 or 51), the projections 23 (33, 43 or 53) can prevent foreign bodies from contacting the charge terminals 24 (34, 44 or 54). Especially, when metal objects, such as clips, fall in the cradle 2 (31, 41 or 51), the formation of the projections 23 (33, 43 or 53) can prevent the metal objects from contacting the charge terminals 24 (34, 44 or 54).

What is claimed is:

1. An electronic device that is powered by a battery and is capable of being slidably attached to a power feeding device that feeds power to the electronic device, comprising:
    a housing that has a first single surface facing a second single surface of the power feeding device when the electronic device is attached to the power feeding device, and a feeding terminal for feeding the power to the electronic device being provided on the second single surface;
    an electrode that is provided on the first single surface and comes into contact with the feeding terminal when the electronic device is attached to the power feeding device; and
    one of a groove and a projection that is provided on the first single surface and engages with the other one of the groove and the projection provided on the second single surface when the electronic device is attached to the power feeding device,
    wherein:
        the groove and the projection extend in a direction in which the electronic device moves when the electronic device is attached to the power feeding device along the first single surface;
        the groove gradually shallows toward ends of the groove, a direction from one end of the ends of the groove to another end of the ends of the groove is substantially parallel to the direction in which the electronic device moves when the electronic device is attached to the power feeding device, and
        a height of the projection reduces gradually toward ends of the projection, a direction from one end of the ends of the projection to another end of the ends of the projection is substantially parallel to the direction in which the electronic device moves when the electronic device is attached to the power feeding device.

2. The electronic device as claimed in claim 1, wherein the electronic device includes the groove, the electrode is provided at a deep position from the first single surface, and a depth of a deepest portion of the groove is greater than a distance from the first surface to the electrode.

3. The electronic device as claimed in claim 1, wherein the electronic device includes the projection, and a height of the projection is greater than a height of the feeding terminal provided on the power feeding device.

4. The electronic device as claimed in claim 1, further comprising:
    a guide that guides the electronic device toward the second single surface.

5. The electronic device as claimed in claim 1,
    wherein the electrode is recessed inwardly from the first single surface a first distance, and
    wherein the one of the groove and projection has a first portion that is a second distance from the first single surface, which second distance is greater than the first distance, and a second portion that is a third distance from the first single surface, which third distance is less than the first distance.

6. The electronic device as claimed in claim 1,
    wherein centers of the one of the groove and the projection and the electrode on the first single surface align side-by-side in a line that is perpendicular to the direction in which the electronic device moves when the electronic device is attached to the power feeding device.

7. A power feeding device that feeds power to an electronic device, comprising:
    a housing that has a first single surface facing a second single surface of the electronic device when the electronic device is attached to the power feeding device, and an electrode for receiving the power from the power feeding device being provided on the second single surface;
    a feeding terminal that is projected from the first single surface and comes into contact with the electrode when the electronic device is attached to the power feeding device; and
    one of a groove and a projection that is provided on the first single surface and engages with the other one of the groove and the projection provided on the second single surface when the electronic device is attached to the power feeding device,
    wherein:
        the groove and the projection extend in a direction in which the electronic device moves when the electronic device is attached to the power feeding device along the first single surface;
        the groove gradually shallows toward ends of the groove, a direction from one end of the ends of the groove to another end of the ends of the groove is substantially parallel to the direction in which the electronic device moves when the electronic device is attached to the power feeding device, and
        a height of the projection reduces gradually toward ends of the projection, a direction from one end of the ends of the projection to another end of the ends of the projection is substantially parallel to the direction in which the electronic device moves when the electronic device is attached to the power feeding device.

8. The power feeding device as claimed in claim 7, wherein
a height of a highest portion of the projection is greater than a height of the feeding terminal.

9. The power feeding device as claimed in claim 7, further comprising:
a guide that guides the electronic device toward the first single surface.

10. The power feeding device as claimed in claim 7, wherein the feeding terminal projects outwardly from the first single surface a first distance, and
wherein the projection has a first portion that projects a second distance from the first single surface, which second distance is greater than the first distance, and a second portion that projects a third distance from the first single surface, which third distance is less than the first distance.

11. The electronic device as claimed in claim 7, wherein centers of the one of the groove and the projection and the electrode on the first single surface align side-by-side in a line that is perpendicular to the direction in which the electronic device moves when the electronic device is attached to the power feeding device.

12. An electronic device system, comprising:
an electronic device that is powered by a battery, and includes a first housing having a first single surface and an electrode provided on the first single surface; and
a power feeding device to which the electronic device is capable of being slidably attached and which feeds power to the electronic device, and that includes a second housing having a second single surface and a feeding terminal for feeding the power to the electronic device being contactable with the electrode, the feeding terminal being provided on the second single surface, the first single surface facing the second single surface when the electronic device is attached to the power feeding device,
wherein:
one of the first single surface of the electronic device and the second single surface of the power feeding device includes a projection,
the other of the first single surface of the electronic device and the second single surface of the power feeding device includes a groove into which the projection is inserted, and
one of the electrode or the feeding terminal projects from the first single surface or the second single surface, respectively
the groove and the projection extend in a direction in which the electronic device moves when the electronic device is attached to the power feeding device along the first single surface;
the groove gradually shallows toward ends of the groove, a direction from one end of the ends of the groove to another end of the ends of the groove is substantially parallel to the direction in which the electronic device moves when the electronic device is attached to the power feeding device, and
a height of the projection reduces gradually toward ends of the projection, a direction from one end of the ends of the projection to another end of the ends of the projection is substantially parallel to the direction in which the electronic device moves when the electronic device is attached to the power feeding device.

13. The electronic device system as claimed in claim 12, wherein the at least one of the electrode or the feeding terminal projects a first distance, and
wherein each of the groove and the projection has a first portion that is a second distance from the first single surface or second single surface, respectively, which second distance is greater than the first distance, and a second portion that is a third distance from the first single surface or second single surface, respectively, which third distance is less than the first distance.

14. The electronic device system as claimed in claim 12, wherein the feeding terminal projects, and the electrode is recessed inwardly from the first single surface a first distance, and
wherein the groove or the projection has a first portion that is a second distance from one or the other of the first single surface and the second single surface, which second distance is greater than the first distance, and a second portion that is a third distance from the one or the other of the first single surface and the second single surface, which third distance is less than the first distance.

15. The electronic device system as claimed in claim 12, wherein the feeding terminal projects outwardly from the second single surface a first distance, and
wherein the projection has a first portion that projects a second distance from the one or the other of the first single surface and the second single surface, which second distance is greater than the first distance, and a second portion that projects a third distance from the one or the other of the first single surface and the second single surface, which third distance is less than the first distance.

16. The electronic device as claimed in claim 12, wherein centers of the one of the groove and the projection and the electrode on the first single surface align side-by-side in a line that is perpendicular direction to the direction in which the electronic device moves when the electronic device is attached to the power feeding device.

* * * * *

UNITED STATES PATENT AND TRADEMARK OFFICE
CERTIFICATE OF CORRECTION

Page 1 of 1

PATENT NO. : 10,135,273 B2
APPLICATION NO. : 14/882984
DATED : November 20, 2018
INVENTOR(S) : Masafumi Chiba et al.

It is certified that error appears in the above-identified patent and that said Letters Patent is hereby corrected as shown below:

In the Claims

Column 12, Line 50:
In Claim 16, after "perpendicular" delete "direction".

Signed and Sealed this
Twenty-second Day of January, 2019

Andrei Iancu
*Director of the United States Patent and Trademark Office*